US008845247B2

(12) United States Patent
Wu et al.

(10) Patent No.: US 8,845,247 B2
(45) Date of Patent: Sep. 30, 2014

(54) THERMAL COMPENSATION SYSTEM FOR A MILLING MACHINE

(75) Inventors: Ching-Wei Wu, Taichung (TW); Ying-Shing Shiao, Changhua County (TW); Chia-Hui Tang, Taichung (TW); Yu-Che Wang, Taichung (TW); Paul Chang, Taichung (TW)

(73) Assignees: Buffalo Machinery Company Limited, Taichung (TW); The Department of Electrical Engineering, National Chang-Hua University of Education, Changhua County (TW)

( * ) Notice: Subject to any disclaimer, the term of this patent is extended or adjusted under 35 U.S.C. 154(b) by 676 days.

(21) Appl. No.: 13/170,793

(22) Filed: Jun. 28, 2011

(65) Prior Publication Data

US 2013/0004256 A1  Jan. 3, 2013

(51) Int. Cl.
*B23Q 15/18* (2006.01)
(52) U.S. Cl.
CPC ...... *B23Q 15/18* (2013.01); *G05B 2219/49219* (2013.01); *G05B 2219/49207* (2013.01); *G05B 2219/45145* (2013.01)
USPC ............ 409/238; 409/186; 409/193; 700/170
(58) Field of Classification Search
CPC ...... B23Q 15/18; B23Q 15/06; B23Q 15/013; B23Q 15/22; B23Q 15/24; B23Q 17/002; B23Q 17/003; B23Q 17/22
USPC ......... 409/238, 186, 188, 193, 195, 135, 207; 700/159, 170, 193, 185
See application file for complete search history.

(56) References Cited

U.S. PATENT DOCUMENTS

| 2,956,344 | A | * | 10/1960 | Rantsch | 374/55 |
| 4,638,421 | A | * | 1/1987 | Kimizuka et al. | 700/195 |
| 4,936,722 | A | * | 6/1990 | Schwinn | 409/220 |
| 5,482,416 | A | * | 1/1996 | Reko | 409/238 |
| 6,049,744 | A | * | 4/2000 | Kinoshita et al. | 700/195 |
| 6,449,516 | B1 | * | 9/2002 | Kyomasu et al. | 700/58 |
| 2004/0024488 | A1 | * | 2/2004 | Seichter et al. | 700/193 |
| 2010/0111630 | A1 | * | 5/2010 | Yamagishi | 409/131 |

FOREIGN PATENT DOCUMENTS

| DE | 10251829 A1 | * | 5/2004 | ............. B23Q 15/18 |
| JE | 03-166044 A | * | 7/1991 | ............. B23Q 15/18 |
| JE | 10-217068 A | * | 8/1998 | ............. B23Q 15/18 |

(Continued)

OTHER PUBLICATIONS

Computer translation of Yamaguchi et al. (JP 2000-233343).*

*Primary Examiner* — Andrea Wellington
*Assistant Examiner* — Ryan Rufo
(74) *Attorney, Agent, or Firm* — Banner & Witcoff, Ltd.

(57) ABSTRACT

A milling machine has a base, a work platform mounted movably on the base, and a ruler mounted on the work platform. The work platform is movable relative to a base axis. The thermal compensation system includes a sensor and a control unit. The sensor is configured to be mounted on the base for sensing a position of each of the work platform and the ruler relative to the base axis. The control unit is coupled to the sensor, and determines a work platform displacement and a ruler displacement according to the positions sensed by the sensor. The control unit further calculates a compensation value based on the work platform displacement and the ruler displacement. The control unit is configured to correct the position of the work platform relative to the base axis according to the compensation value.

8 Claims, 6 Drawing Sheets

(56) References Cited

FOREIGN PATENT DOCUMENTS

| | | | | | |
|---|---|---|---|---|---|
| JP | 03-142145 A | * | 6/1991 | ............. | B23Q 15/18 |
| JP | 2000-233343 | * | 8/2000 | ............. | B23Q 15/18 |
| JP | 2002-273642 | * | 9/2002 | ............. | B23Q 15/18 |
| JP | 2011-051026 A | * | 3/2011 | ............. | B23Q 15/18 |

* cited by examiner

THERMAL COMPENSATION SYSTEM FOR A MILLING MACHINE

BACKGROUND OF THE INVENTION

1. Field of the Invention

The invention relates to a thermal compensation system, and more particularly to a thermal compensation system for a milling machine.

2. Description of the Related Art

During operation of a conventional milling machine, heat may be generated that causes deformation of parts of the conventional milling machine. This deformation may in turn cause positioning errors of a work piece that lead to manufacturing errors. Cooling systems alone may fail to correct the manufacturing errors.

SUMMARY OF THE INVENTION

Therefore, an object of the present invention is to provide a thermal compensation system for a milling machine that can increase manufacturing precision.

An aspect of the invention is a thermal compensation system for a milling machine. The milling machine has a base, a work platform mounted movably on the base, and a ruler mounted on the work platform. The work platform is movable relative to a base axis. The thermal compensation system comprises a first sensor and a control unit. The first sensor is configured to be mounted on the base for sensing a position of each of the work platform and the ruler relative to the base axis. The control unit is coupled to the first sensor, and determines a work platform displacement and a ruler displacement according to the positions sensed by the first sensor. The control unit further calculates a compensation value based on the work platform displacement and the ruler displacement. The control unit is configured to correct the position of the work platform relative to the base axis according to the compensation value.

The thermal compensation system for a milling machine according to this invention may have the advantage of increasing manufacturing precision by compensating positioning errors caused by temperature-related length changes.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
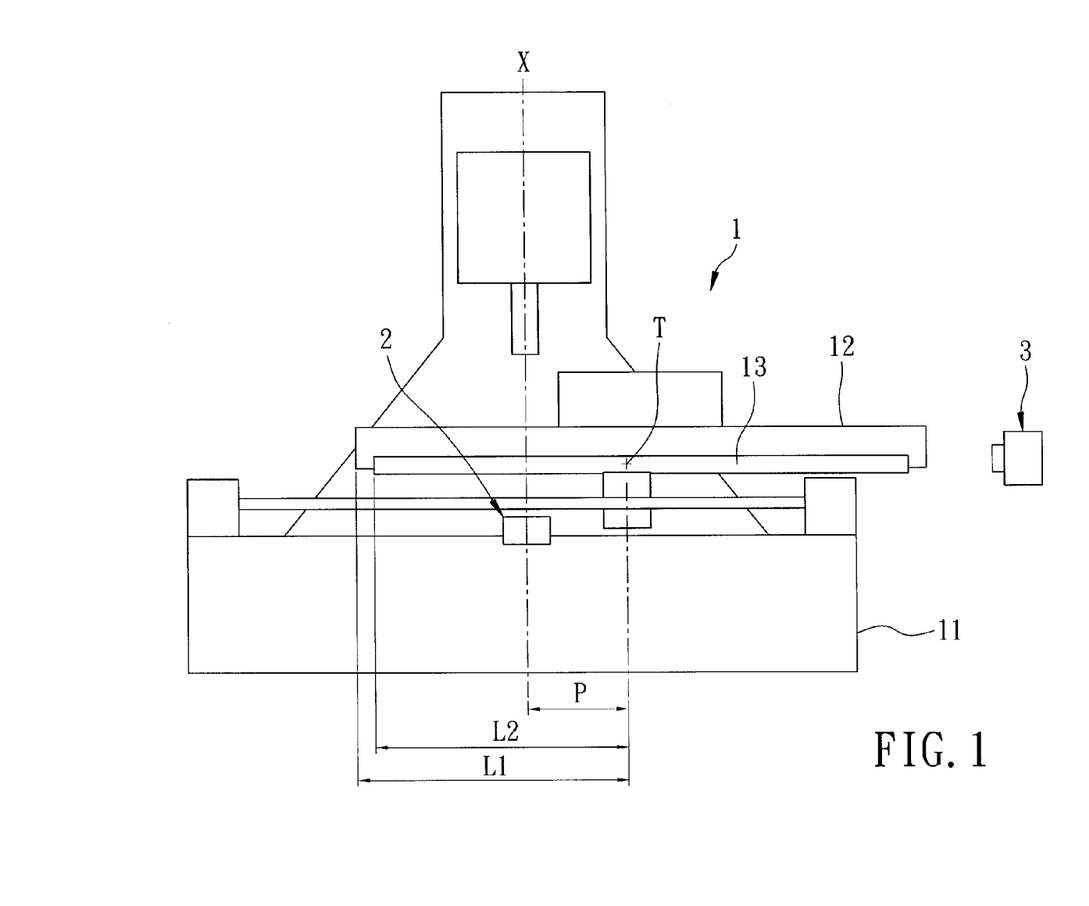
FIG. 1 is a schematic view of a thermal compensation system according to the preferred embodiment of the present invention.
Figure 2:
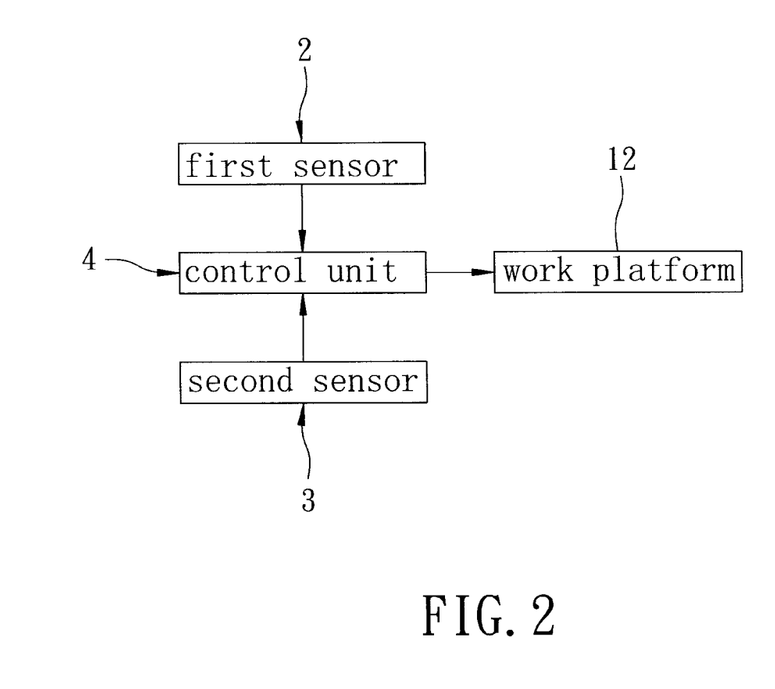
FIG. 2 is a block diagram of the preferred embodiment.
Figure 3:
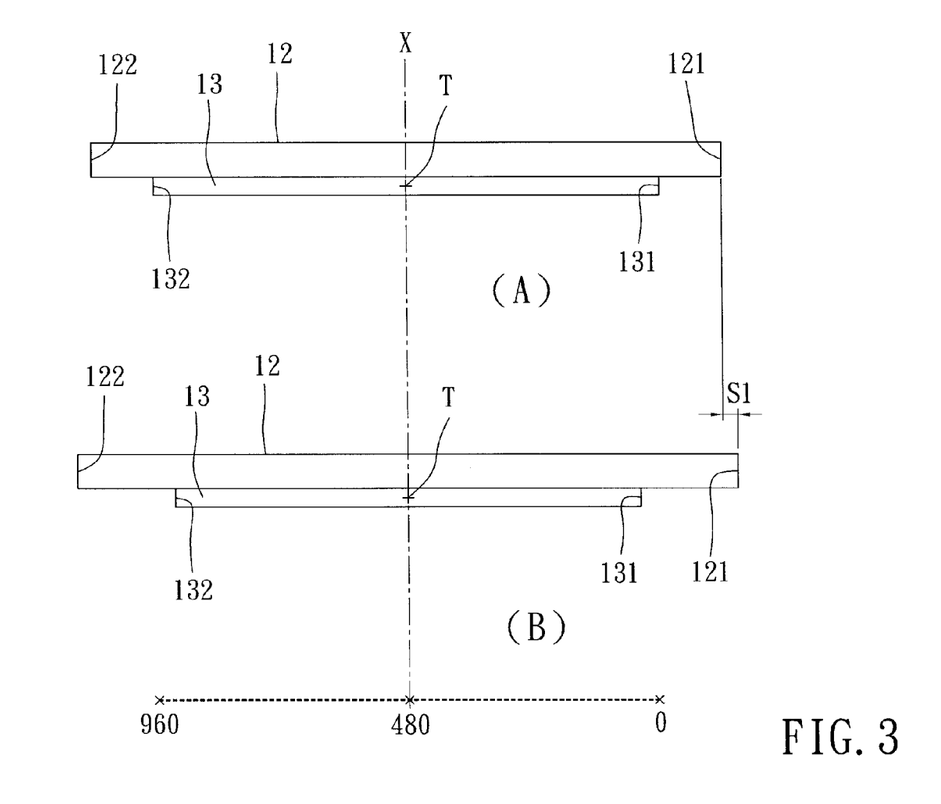
FIG. 3 is a schematic view illustrating a work platform positioned relative to an axis, according to the preferred embodiment.

Referring to FIGS. 1 to 3, the preferred embodiment of a thermal compensation system according to the present invention is shown to be adapted to be mounted on a milling machine 1. The milling machine 1 has a base 11, a work platform 12 mounted movably on the base 11 for reciprocal motion relative to an axis (X), and a ruler 13 mounted on the base 11. The work platform 12 may be loaded with a workpiece. The thermal compensation system comprises: a first sensor 2, a second sensor 3, and a control unit 4.

The first sensor 2 is mounted on the base 11 and aligned with the axis (X). In this embodiment, the first sensor 2 is an optical reader for optically detecting measurement marks of the ruler 13 to measure the displacement relative to the axis (X) by the work platform 12 and the ruler 13, respectively.

The second sensor 3 is mounted on the base 11 for sensing the magnitude of position changes relative to the axis (X) of a first end portion 121 of the work platform 12 and a first end portion 131 of the ruler 13, respectively, caused by thermal length changes of the ruler 13 and/or the work platform 12. In this embodiment, the second sensor 3 is a laser distance sensor.

Figure 4:
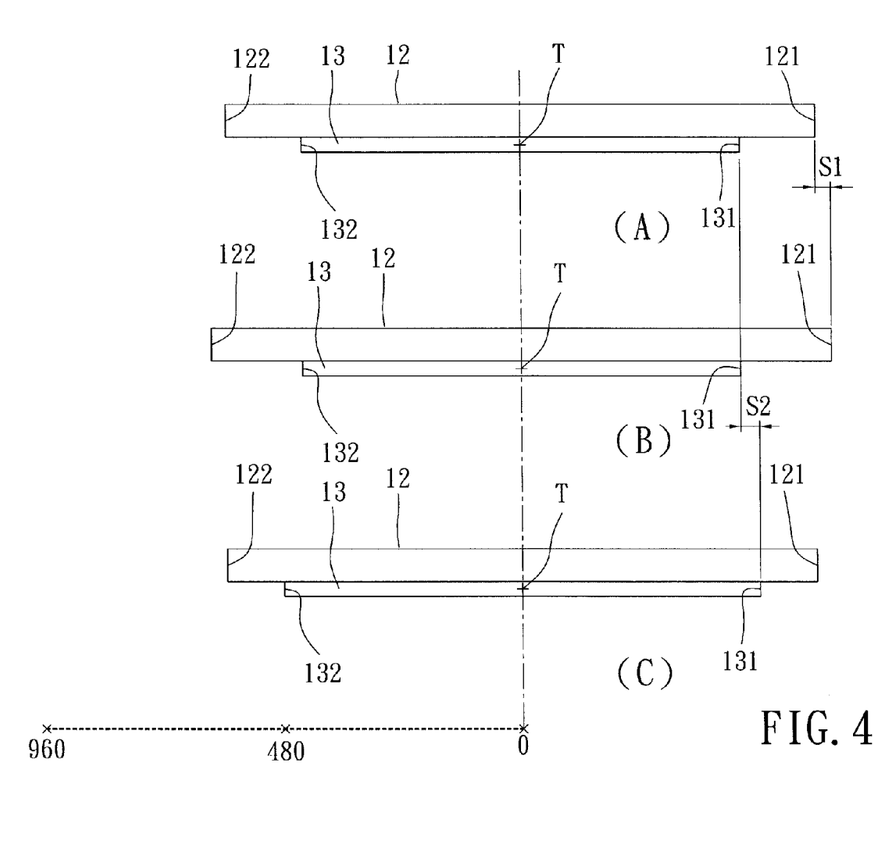
FIG. 4 is a schematic view illustrating the work platform at another position relative to the axis, according to the preferred embodiment.

Referring to FIGS. 2, 3 and 4, the control unit 4 is used for determining a work platform displacement (L1) and a platform length change (S1) corresponding to the work platform 12 and a ruler displacement (L2) and a ruler length change (S2) corresponding to the ruler 13 according to the respective corresponding displacement amounts and deformation amounts, and then calculates a compensation value (C) according to formula (1):

$$C = P \times (S1/L1 - S2/L2) \qquad \text{Formula 1}$$

Where (P) is the distance between the first sensor 2 and a ruler center (T) of the ruler 13.

The work platform displacement (L1), the ruler displacement (L2), the platform length change (S1) and the ruler length change (S2) may be acquired as follows:

First, in an embodiment, the ruler 13 and the work platform 12 are structurally symmetric. Therefore, the measurements of the length changes and displacements of the ruler 13 and the work platform 12 are measured along a line in two opposite direction relative to the ruler center (T). Assuming that the position changes of the first end portions 121, 131 are the same magnitude but in opposite direction to the position changes of the second end portions 122, 132, then only one second sensor 3 is needed in this embodiment to measure the temperature-related changes in positions of the first end portions 121, 131 of the work platform 12 and the ruler 13, respectively. Moreover, the ruler center (T) is assumed to be fixed in alignment with the axis (X).

As shown in FIG. 3, the potential positions for the work platform 12 range between 0 to 960 mm. When the ruler center (T) of the ruler 13 is moved with the work platform 12 to the axis (X) at the point 480 mm, the first sensor 2 senses the measurement mark of the ruler 13 to permit determination of the relative position of the base 11 after the displacement. Assuming that the ruler center (T) of the ruler 13 coincides with the axis (X), the ruler length change (S2) may be negligible, and only the thermal length change of the work platform 12 may be considered. The normal and undeformed work platform 12 and ruler 13 are shown in FIG. 3(A). When thermal length changes of the work platform 12 occur as shown in FIG. 3(B), the second sensor 3 senses the platform length change (S1) of the work platform 12, and based on the output of the second sensor 3, the control unit 4 determines the platform length change (S1). At this time, because the work platform 12 yields a (negative) length change toward the axis (X), the measured error value is −S1 when the work platform 12 is disposed at the point 480 mm.

Referring to FIG. 4, when the ruler center (T) of the ruler 13 is moved with the work platform 12 to the point 0 mm, the normal and undeformed work platform 12 and ruler 13 are shown in FIG. 4(A). When thermal length changes affect the work platform 12 as shown in FIG. 4(B) and the ruler 13 as shown in FIG. 4(C), the second sensor 3 senses the length changes of the work platform 12 and the ruler 13, and the control unit 4 determines the platform length change (S1) of the work platform 12 and/or the ruler length change (S2) of the ruler 13 according to the output of the second sensor 3. At this time, because the work platform 12 has a (negative) length change toward the axis (X), the measured error value is −S1-S2 when the work platform 12 is disposed at the point 0 mm.

Figure 5:
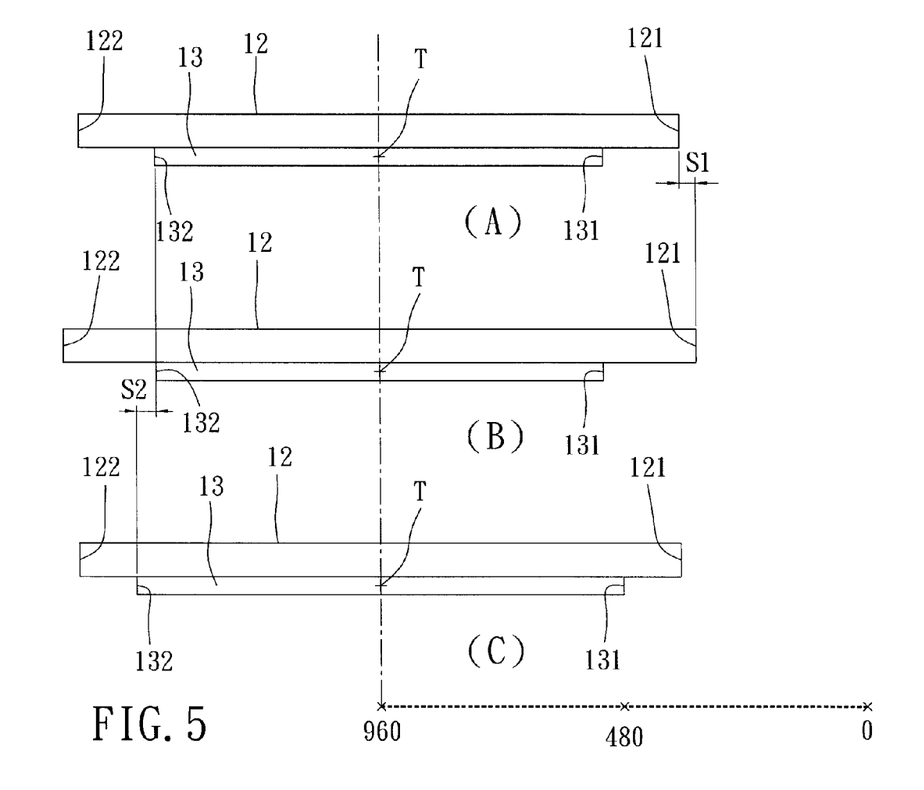
FIG. 5 is a schematic view illustrating the work platform at yet another position relative to the axis, according to the preferred embodiment.

Referring to FIG. 5, when the ruler center (T) of the ruler 13 is moved with the work platform 12 to the point 960 mm, the normal and undeformed work platform 12 and ruler 13 are shown in FIG. 5(A). When thermal length change affects the work platform 12 as shown in FIG. 5(B) and the ruler 13 as shown in FIG. 5(C), the second sensor 3 senses the thermal length change of the work platform 12 and the ruler 13, and the control unit 4 determines the platform length change (S1) of the work platform 12 and/or the ruler length change (S2) of the ruler 13 according to the output of the second sensor 3. At this time, because the work platform 12 yields a positive deformation toward the axis (X), the measured error value is S1-S2 when the work platform 12 is disposed at the point 960 mm.

The control unit 4 calculates a compensation value (C) according to formula (1), and controls movement of the work platform 12 in a direction opposite to the thermal length change direction according to the compensation value (C) to compensate for the thermal length change.

Figure 6:
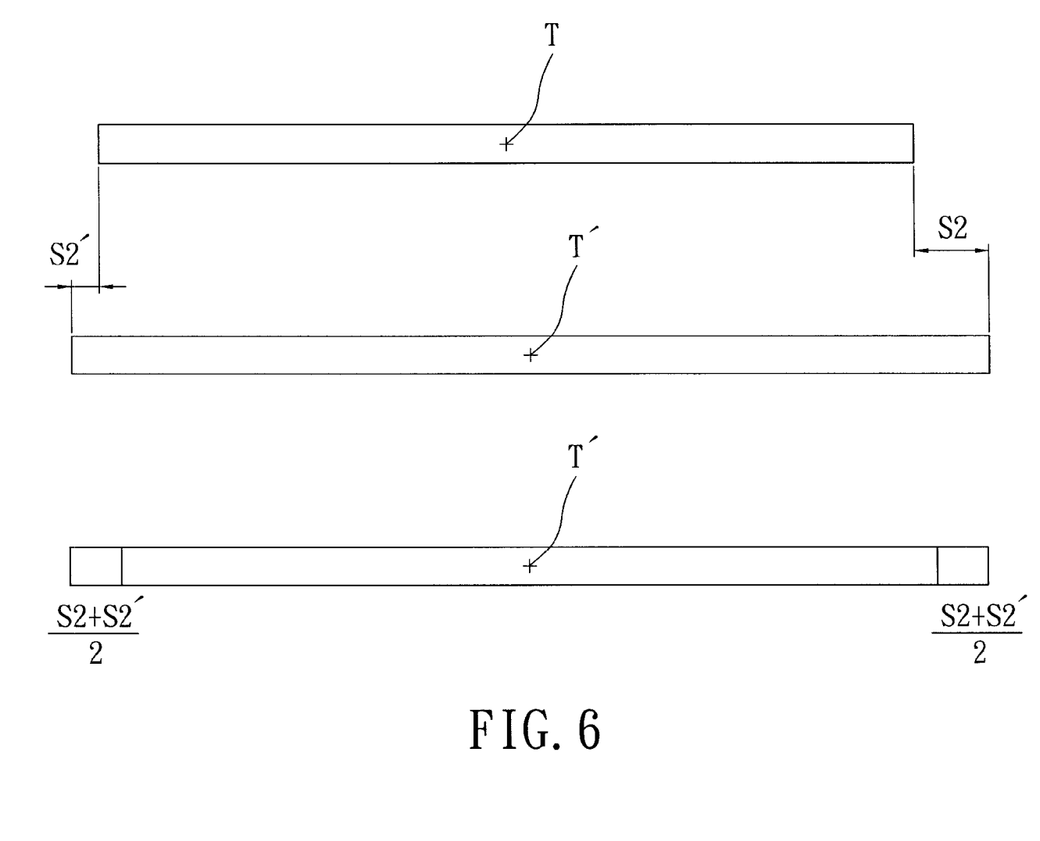
FIG. 6 is a schematic view illustrating temperature-related length changes of a ruler, according to the preferred embodiment.

Referring to FIG. 6, the position changes of the first end portions 121, 131 of the work platform 12 and the ruler 13 may be different from the position changes of the second end portions 122, 132 of the work platform 12 and the ruler 13. For this reason, in another embodiment, a pair of second sensors 3 may be implemented for simultaneously sensing the thermal length changes of the first end portions 121, 131 and the second end portions 122, 132 relative to the axis (X). Based on the output of the pair of second sensors 3, the control unit 4 can calculate a compensation value (C) according to formula (1). Given that the actual ruler center (T) of the ruler 13 may be displaced by asymmetrical thermal length changes, the actual center (T') of the ruler 13 is defined as:

$$T'=P+(S2+S2')/2$$

In this way, the compensation value (C) may be calculated according to formula (1). The control unit 4 then controls movement of the work platform 12 along a direction opposite to the thermal length change direction according to the compensation value (C) to compensate for the thermal length changes.

This invention can establish a model database using the platform length change (S1) and the ruler length change (S2) sensed by the second sensor 3. Once the model database has been established, this invention may operate using the model database records without the use of the second sensor 3. In other words, the platform length change (S1) and the ruler length change (S2) may be derived from the model database.

The thermal compensation system for a milling machine according to this invention may have the advantage of increasing manufacturing precision by compensating positioning errors caused by temperature-related length changes.

While the present invention has been described in connection with what is considered the most practical and preferred embodiment, it is understood that this invention is not limited to the disclosed embodiments but is intended to cover various arrangements included within the spirit and scope of the broadest interpretation to encompass all such modifications and equivalent arrangements.

What is claimed is:

1. A thermal compensation system for a milling machine, the milling machine having a base, a work platform mounted movably on the base, and a ruler mounted on the work platform, the ruler including a first ruler end, a ruler center, and a second ruler end, the ruler center being located at a point halfway between the first ruler end and the second ruler end, the work platform being movable relative to a base axis, and including a first platform end and a second platform end, said thermal compensation system comprising:

a first sensor to be mounted on the base for sensing a position of each of the work platform and the ruler relative to the base axis;

a second sensor to be mounted on the base and configured for sensing a thermal position change of each of the first platform end and the first ruler end relative to the base axis for determining a platform length change and a ruler length change, respectively; and a control unit coupled to said first sensor, said control unit determining a work platform displacement and a ruler displacement according to the positions sensed by said first sensor, calculating a compensation value based on the work platform displacement, the ruler displacement, the platform length change, and the ruler length change, and being configured to correct the position of the work platform relative to the base axis according to the compensation value.

2. The thermal compensation system for a milling machine as claimed in claim 1, wherein said control unit is configured to correct the position of the work platform relative to the base axis by moving the work platform in a direction opposite to the work platform displacement.

3. The thermal compensation system for a milling machine as claimed in claim 1, wherein the compensation value equals (a distance between said first sensor and the ruler center)× ((the platform length change/the work platform displacement)−(the ruler length change/the ruler displacement)).

4. The thermal compensation system for a milling machine as claimed in claim 1, further comprising an additional second sensor to be mounted on the base and configured for sensing a thermal position change of the second ruler end relative to the base axis, wherein the distance between said first sensor and the ruler center) is compensated by a correction factor equal to one-half of the sum of the thermal position changes of the first and second ruler ends when said control unit calculates the compensation value.

5. The thermal compensation system for a milling machine as claimed in claim 1, wherein a numerical sign of each of the platform length change and the ruler length change is determined based on the work platform displacement.

6. A thermal compensation system for a milling machine, the milling machine having a base, a work platform mounted movably on the base, and a ruler mounted on the work platform, the work platform being movable relative to a base axis, said thermal compensation system comprising:

a first sensor to be mounted on the base for sensing a position of each of the work platform and the ruler relative to the base axis;

a database from which a platform length change and a ruler length change are retrieved; and a control unit coupled to said first sensor and said database, said control unit determining a work platform displacement and a ruler displacement according to the positions sensed by said first sensor, calculating a compensation value based on the work platform displacement, the ruler displacement, the platform length change, and the ruler length change, and being configured to correct the position of the work platform relative to the base axis according to the compensation value.

7. The thermal compensation system for a milling machine as claimed in claim 6, wherein the compensation value equals (a distance between said first sensor and the ruler center)× ((the platform length change/the work platform displacement)−(the ruler length change/the ruler displacement)).

8. The thermal compensation system for a milling machine as claimed in claim 6, wherein a numerical sign of each of the platform length change and the ruler length change is determined based on the work platform displacement.

\* \* \* \* \*